United States Patent
Matalon

(10) Patent No.: US 9,016,307 B2
(45) Date of Patent: Apr. 28, 2015

(54) QUICK CONNECT, POST ENERGIZED FLANGED JOINT FOR A DIAPHRAGM VALVE

(75) Inventor: Louis E. Matalon, Lancaster, PA (US)

(73) Assignee: ITT Manufacturing Enterprises LLC., Wilmington, DE (US)

( * ) Notice: Subject to any disclaimer, the term of this patent is extended or adjusted under 35 U.S.C. 154(b) by 0 days.

(21) Appl. No.: 13/554,532

(22) Filed: Jul. 20, 2012

(65) Prior Publication Data

US 2014/0020769 A1 Jan. 23, 2014

(51) Int. Cl.
| F16K 7/16 | (2006.01) |
| F16K 31/53 | (2006.01) |
| F16K 7/12 | (2006.01) |
| F16K 27/02 | (2006.01) |

(52) U.S. Cl.
CPC ............. *F16K 7/126* (2013.01); *F16K 27/0236* (2013.01)

(58) Field of Classification Search
USPC ........... 137/315.05; 251/331, 61.1–61.5, 248, 251/249.5
See application file for complete search history.

(56) References Cited

U.S. PATENT DOCUMENTS

| 195,596 | A | 9/1877 | Fenn et al. |
| 1,609,813 | A | 12/1926 | Gorman |
| 1,992,043 | A | 2/1935 | Saunders |
| 2,388,989 | A | 11/1945 | Mueser |
| 2,504,057 | A | 4/1950 | Trefil |
| 2,582,996 | A | 1/1952 | Laurent |
| 2,710,629 | A | 6/1955 | Price |
| 2,717,757 | A | 9/1955 | Bowlzer |
| 2,872,935 | A | 2/1959 | Kenney |
| 3,026,852 | A | 3/1962 | Stelzer |
| 3,067,764 | A | 12/1962 | Geary |
| 3,148,861 | A | 9/1964 | McFarland, Jr. |
| 3,204,919 | A | 9/1965 | Tripoli et al. |
| 3,257,095 | A | 6/1966 | Siver |
| 3,349,795 | A | 10/1967 | Matsutani |
| 3,521,667 | A | 7/1970 | Johnson |
| 3,561,480 | A | 2/1971 | Fairchild |
| 3,631,882 | A | 1/1972 | White, Jr. |
| 3,811,649 | A | 5/1974 | Press et al. |
| 3,982,729 | A | 9/1976 | Tricini |
| 4,014,514 | A | 3/1977 | Priese et al. |
| 4,026,513 | A | 5/1977 | Callenberg |

(Continued)

FOREIGN PATENT DOCUMENTS

| DE | 3447329 | 7/1986 |
| DE | 102009023002 | 12/2010 |

(Continued)

OTHER PUBLICATIONS

English Language Abstract WO2008034686 (1 page), Feb. 2012.

(Continued)

*Primary Examiner* — Kevin Lee

(57) ABSTRACT

A diaphragm valve has a valve body with a passage to be opened to allow fluid to pass through the valve body and to be closed to prevent fluid from passing through the valve body, and has a bonnet assembly with a pressure ring to load and unload a diaphragm based on a first spring constant to seal a peripheral portion of the diaphragm, and a compressor to close or open the passage of the valve body. The valve body and bonnet assembly have a connection that allows the valve body and bonnet assembly to be substantially fixed together with a second spring constant that is substantially higher than and independent from the first spring constant.

8 Claims, 4 Drawing Sheets

(56) References Cited

U.S. PATENT DOCUMENTS

| | | | |
|---|---|---|---|
| 4,077,605 | A | 3/1978 | Kutz et al. |
| 4,214,604 | A | 7/1980 | Rumsey |
| 4,231,549 | A | 11/1980 | Visalli |
| 4,295,485 | A | 10/1981 | Waterfield |
| 4,452,428 | A | 6/1984 | Scaramucci |
| 4,498,798 | A | 2/1985 | Day |
| 4,746,095 | A | 5/1988 | Roush |
| 4,750,709 | A | 6/1988 | Kolenc et al. |
| 5,029,813 | A | 7/1991 | Walton et al. |
| 5,295,662 | A | 3/1994 | Yamaji et al. |
| 5,411,350 | A | 5/1995 | Breault |
| 5,439,197 | A * | 8/1995 | Itoi et al. .......... 251/331 |
| 5,551,477 | A | 9/1996 | Kanno et al. |
| 5,597,184 | A | 1/1997 | Brenes et al. |
| 5,624,102 | A | 4/1997 | Nishimura et al. |
| 5,669,596 | A | 9/1997 | Yoshikawa et al. |
| 6,007,045 | A | 12/1999 | Heiniger et al. |
| 6,056,003 | A | 5/2000 | Madsen et al. |
| 6,123,315 | A | 9/2000 | Keller |
| 6,155,535 | A | 12/2000 | Marcilese |
| 6,227,520 | B1 | 5/2001 | Huber, Jr. |
| 6,296,227 | B1 | 10/2001 | Burcham et al. |
| 6,443,426 | B1 | 9/2002 | Brenes |
| 6,619,612 | B2 * | 9/2003 | Freisinger et al. ......... 251/30.03 |
| 6,845,959 | B2 | 1/2005 | Berckenhoff et al. |
| 7,059,584 | B2 | 6/2006 | Balasurbamanian |
| 7,377,483 | B2 | 5/2008 | Iwabuchi et al. |
| 7,628,376 | B2 | 12/2009 | Masamura et al. |
| 7,789,012 | B2 | 9/2010 | Marcilese et al. |
| 7,815,169 | B2 | 10/2010 | Arosio |
| 8,056,578 | B2 | 11/2011 | Lopp et al. |
| 2005/0045847 | A1 | 3/2005 | Powell |
| 2011/0031427 | A1 | 2/2011 | Sitnikov |
| 2012/0061597 | A1 | 3/2012 | Speer |
| 2012/0068102 | A1 | 3/2012 | Anagnos et al. |

FOREIGN PATENT DOCUMENTS

| | | |
|---|---|---|
| EP | 0023409 | 2/1981 |
| EP | 0099945 | 2/1984 |
| EP | 0870957 | 10/1998 |
| EP | 1138989 | 10/2001 |
| EP | 2064468 | 7/2011 |
| FR | 511989 | 1/1921 |
| GB | 794992 | 5/1958 |
| GB | 685935 | 1/1965 |
| GB | 1011970 | 12/1965 |
| GB | 1080902 | 8/1967 |
| GB | 2173882 | 10/1986 |
| GB | 2460227 | 11/2009 |
| IL | 35178 | 4/1973 |
| JP | H0193674 | 4/1989 |
| JP | 2004204977 | 7/2004 |
| JP | 2008190546 | 8/2008 |
| WO | 9500782 | 1/1995 |
| WO | 9717558 | 5/1997 |
| WO | 2011014436 | 2/2011 |

OTHER PUBLICATIONS 1 pg EP0870957 English Language Abstract, Oct. 1998.
1 page DE102009023002 English Language Abstract, Dec. 2010.
2 pgs. JPH0193674 English Language Abstract, Apr. 1989.
1 pg JP2008190546 English Language Abstract, Aug. 2008.
1 pg DE3447329 English Language Abstract, Jul. 1986.
2 pgs JP2004204977 English Language Abstract, Jul. 2004.

* cited by examiner

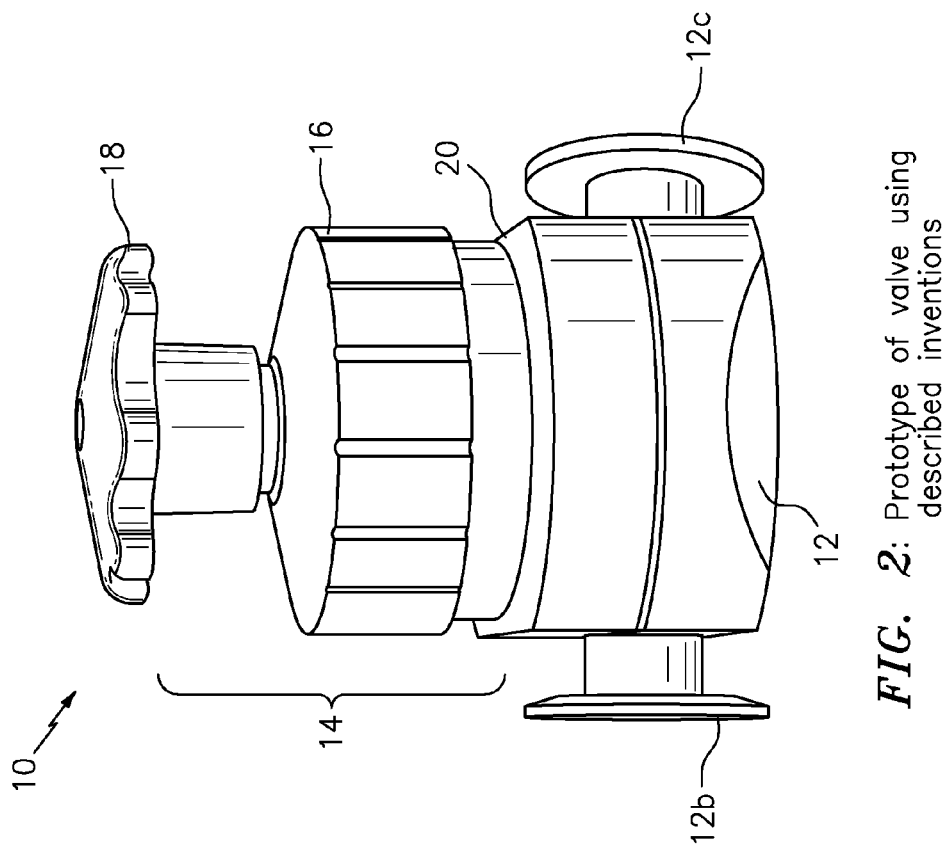
FIG. 2: Prototype of valve using described inventions
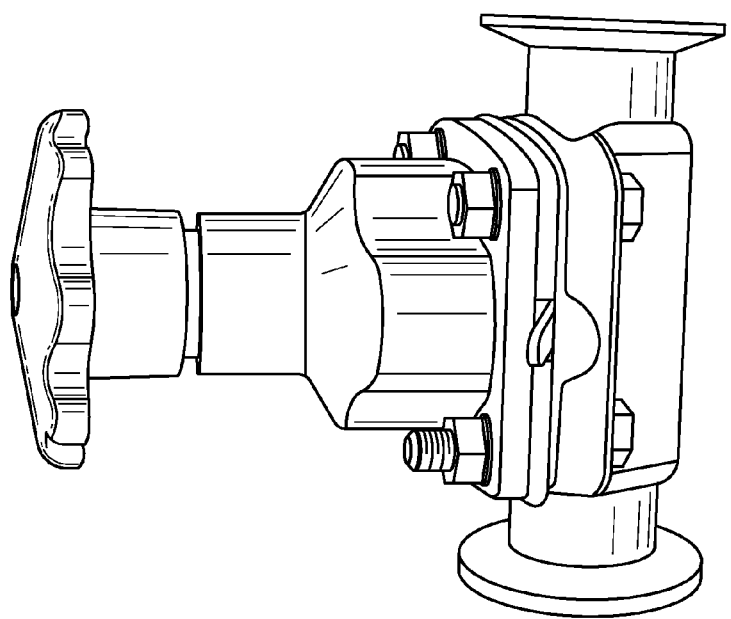
FIG. 1: State-of-the-art manual (PRIOR ART) diaphragm valve

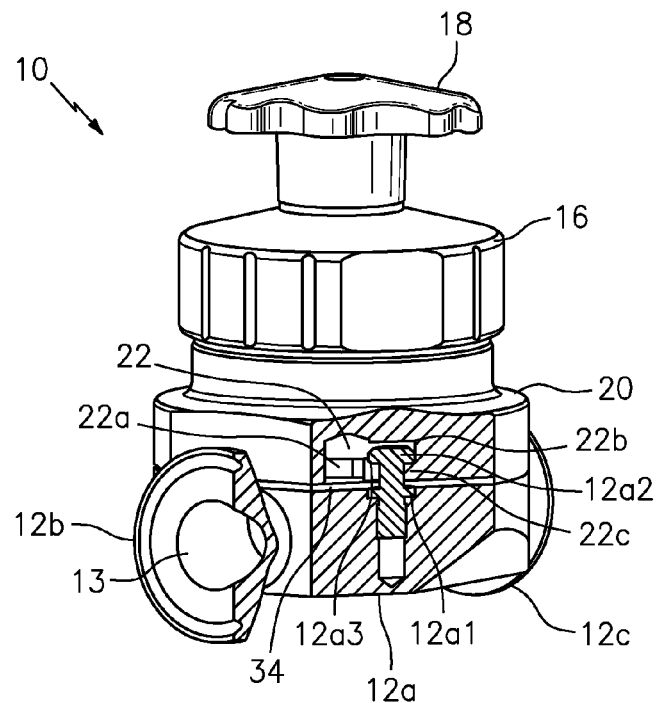
FIG. 3f: Stud keyway
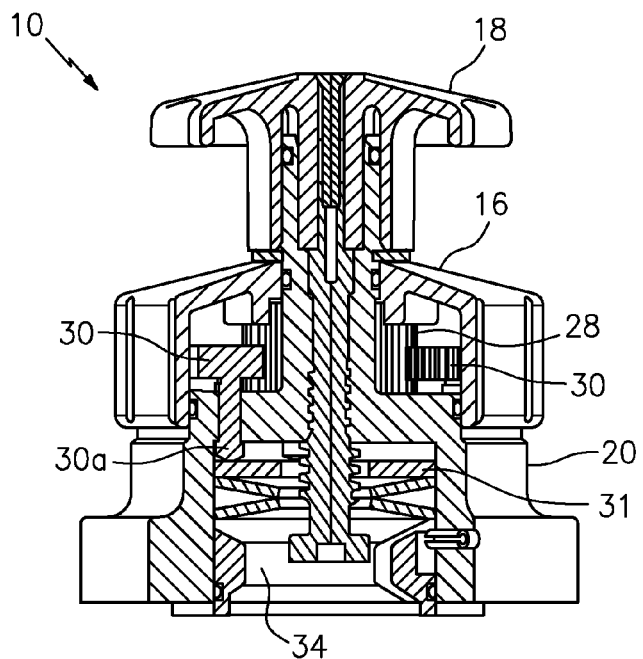
FIG. 3g: Gears force p-ring, 34 down

US 9,016,307 B2

QUICK CONNECT, POST ENERGIZED FLANGED JOINT FOR A DIAPHRAGM VALVE

BACKGROUND OF THE INVENTION

1. Field of the Invention

The present invention relates to a diaphragm valve; and more particularly relates to a joint for a diaphragm valve.

2. Brief Description of Related Art

By way of example, FIGS. 1 shows a standard diaphragm valve that is known in the art. Standard tools and fasteners for a flanged bonnet on such a diaphragm valve require removal of several pieces in order to replace or access the wear part (diaphragm). A "typical" flange on a one-inch valve requires four bolts, four nuts, and eight washers, for a total of sixteen loose parts. Stainless steel bolts are prone to galling and the joint is prone to leakage if the bolts are under loaded. Screw threads, and holes in the body and bonnet flanges, which are partially covered by the bolt head or nut provide areas of entrapment for cleaning solutions and bacteria, which is highly undesirable in biopharmaceutical manufacturing applications.

A key performance weakness of the standard joint is that the body to bonnet connection also provides the flange seal loading. This reduces the ability for the flange seal to be compliant to thermal expansion of the seal, for if it is made compliant with a reduced spring constant, that lower spring constant will allow the body and bonnet seal flanges to separate when the compressor load is applied for valve closure.

SUMMARY OF THE INVENTION

According to some embodiments, the present invention may take the form of apparatus, including a diaphragm valve, that features a valve body and a bonnet assembly. The valve body is configured with a passage to be opened to allow fluid to pass through the valve body and to be closed to prevent fluid from passing through the valve body. The bonnet assembly has a compressor, a pressure ring, and a diaphragm, where the pressure ring is configured to load and unload the diaphragm based at least partly on a first spring constant to seal a peripheral portion of the diaphragm, and the compressor configured to close or open the passage of the valve body. The valve body and bonnet assembly are configured with a connection that allows the valve body and bonnet assembly to be substantially fixed together with a second spring constant that is substantially higher than and independent from the first spring constant.

According to some embodiments of the present invention, the connection is a rotational connection, that may include, or take the form of, the valve body having a rim or surface configured with at least two shouldered pins arranged on opposite sides of the valve body; and the bonnet assembly having a corresponding rim or surface configured with at least two keyways arranged on opposite sides of the bonnet assembly, and each keyway being recessed and configured to receive and engage a respective shouldered pin when the bonnet assembly is rotated in relation to the valve body. Embodiments are also envisioned within the spirit of the present invention where the connection is configured as, or takes the form of, a linear connection.

According to some embodiments of the present invention, each shouldered pin may be configured with one end coupled to the rim or surface and another end with a shouldered portion; and each keyway may include a first opening portion configured to receive a respective shoulder portion of the respective shouldered pin, and each keyway may include a second opening portion configured to receive and engage the respective shoulder portion when the respective shouldered pin is inserted into a respective keyway and the bonnet assembly is rotated in relation to the valve body.

According to some embodiments of the present invention, the bonnet assembly may include a cover configured to be rotated to cause the pressure ring to seal the peripheral portion of the diaphragm based at least partly on the first spring constant. By way of example, and according to some embodiments of the present invention, the cover may be configured to attach to and rotate a central gear to cause the pressure ring to seal the peripheral portion of the diaphragm, and the central gear may be configured to turn multiple gear-headed screws that compress one or more spring disc washers, which drives the pressure ring that compresses the diaphragm against the valve body to seal the peripheral portion of the diaphragm.

According to some embodiments of the present invention, the valve body may be configured with multiple shouldered pins, including four, arranged in a circular pattern, substantially equi-distant in relation to one another on the rim or surface; and the bonnet assembly may be configured with multiple keyways, including four, arranged in a corresponding circular pattern as the multiple shoulder pins.

According to some embodiments of the present invention, the bonnet assembly may be configured with a central load thread mechanism that includes a bonnet portion having threads; a nut portion having corresponding threads and being configured to engage the pressure ring, so that when the nut portion is rotated the pressure ring loads or unloads the diaphragm based at least partly on the first spring constant to seal the peripheral portion of the diaphragm, and the compressor configured to close or open the passage.

According to some embodiments of the present invention, the rotation connection may include the valve body being configured with a surface and at least two radially-extending flange portions arranged on opposite sides of the valve body; and the bonnet assembly having a corresponding surface configured with at least two channel portions, each channel portion being recessed and configured to receive and engage a respective radially-extending flange portion when the bonnet assembly is rotated in relation to the valve body.

BRIEF DESCRIPTION OF THE DRAWING

The drawing includes the following Figures, not necessarily drawn to scale:

FIG. 1 shows a diaphragm valve that is known in the art.

FIG. 2 shows a diaphragm valve according to some embodiments of the present invention.

FIG. 3 includes FIGS. 3a to 3e, where FIG. 3f is a partial cutaway of the valve body and bonnet assembly showing a stud keyway arrangement, according to some embodiments of the present invention; and FIG. 3g is a partial cutaway (90°) of the valve body and bonnet assembly showing a load travel path from gear headed screws to a pressure ring, according to some embodiments of the present invention.

FIG. 4 includes FIGS. 4a to 4c, where

Figure 3A:
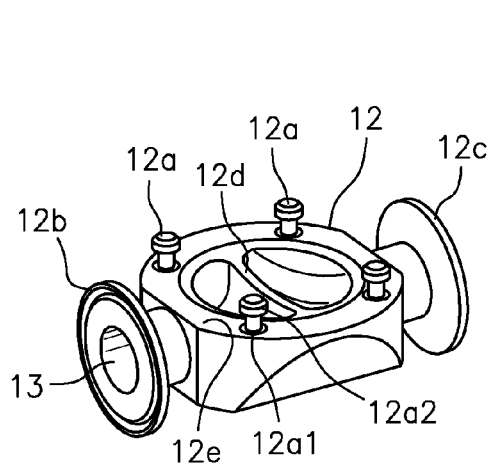
FIG. 3a shows a perspective view of a valve body according to some embodiments of the present invention.

In the following description of the exemplary embodiment, reference is made to the accompanying Figures in the drawing, which form a part hereof, and in which are shown by way of illustration of an embodiment in which the invention may be practiced. It is to be understood that other embodiments may be utilized, as structural and operational changes may be made without departing from the scope of the present invention.

DETAILED DESCRIPTION OF THE INVENTION

FIGS. 2 and 3 show apparatus generally indicated as 10, such as a diaphragm valve, according to some embodiments of the present invention. The diaphragm valve 10 includes a valve body 12 and a bonnet assembly generally indicated as 14. The valve body 12 is configured with a passage 13 to be opened to allow fluid to pass through the valve body and to be closed to prevent fluid from passing through the valve body 12. The bonnet assembly 14 has a compressor 15, a pressure ring 34, and a diaphragm 17. The pressure ring 34 is configured to load and unload the diaphragm 17 based at least partly on a first spring constant to seal a peripheral portion 17a of the diaphragm 17. The compressor 15 is configured to close or open the passage 13 of the valve body 12. The valve body 12 and bonnet assembly 14 are configured with a connection or attachment, e.g., which may be a rotational connection or attachment, that allows the valve body 12 and the bonnet assembly 14 to be substantially fixed together with a second spring constant that is substantially higher than and independent from the first spring constant.

Figure 3B:
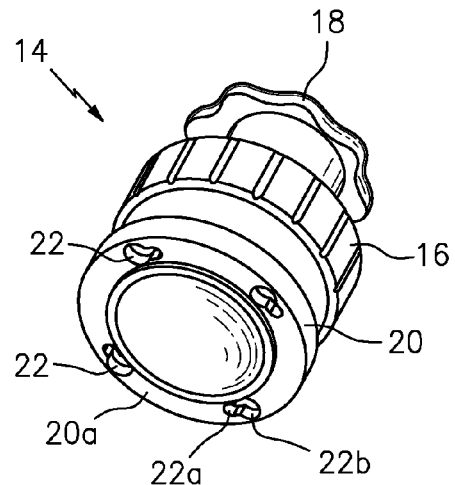
FIG. 3b shows a bottom perspective view of a bonnet assembly according to some embodiments of the present invention.
Figure 3C:
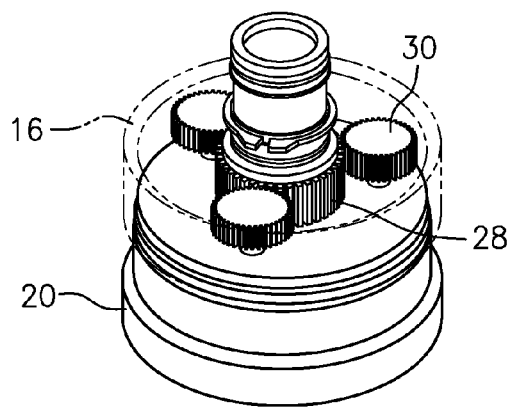
FIG. 3c shows a perspective view of part of a bonnet assembly according to some embodiments of the present invention.
Figure 3D:
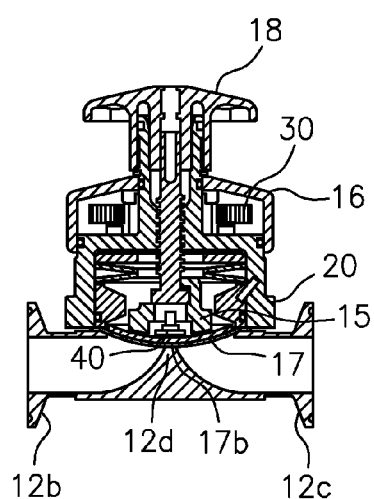
FIG. 3d shows a cross-sectional view of a diaphragm valve according to some embodiments of the present invention.
Figure 3E:
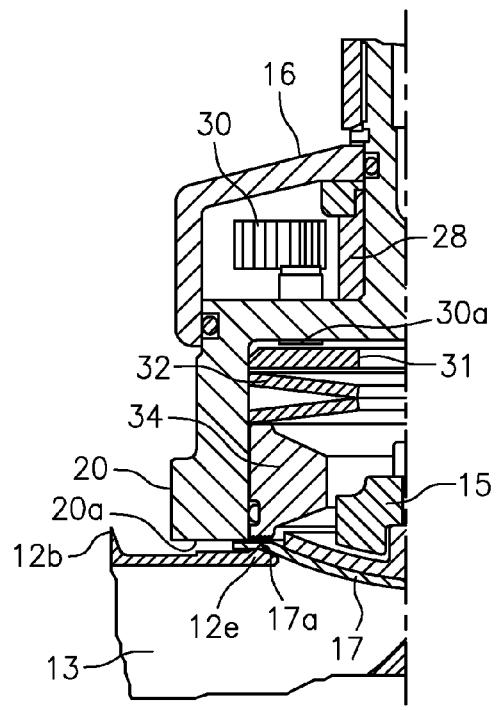
FIG. 3e shows an enlarged view of part of the diaphragm valve shown in FIG. 3d according to some embodiments of the present invention.
Figures 4A, 4B:
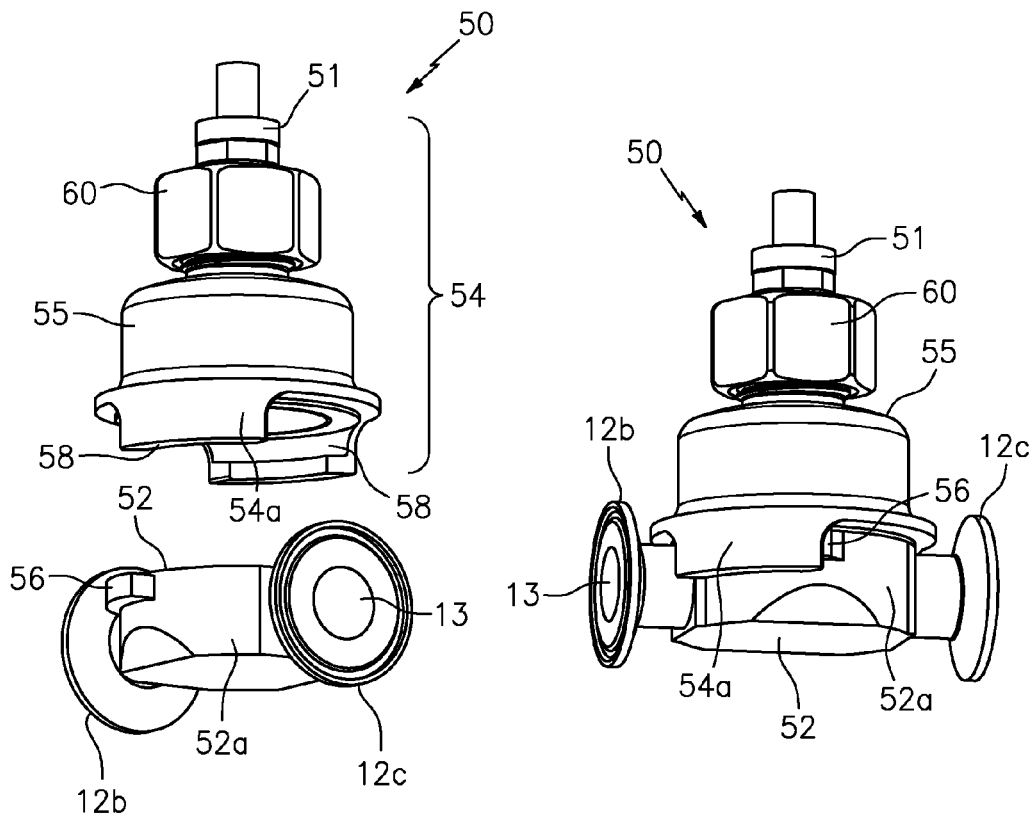
FIG. 4a shows an exploded view of a diaphragm valve according to some embodiments of the present invention.
FIG. 4b shows a diaphragm valve according to some embodiments of the present invention.
Figure 4C:
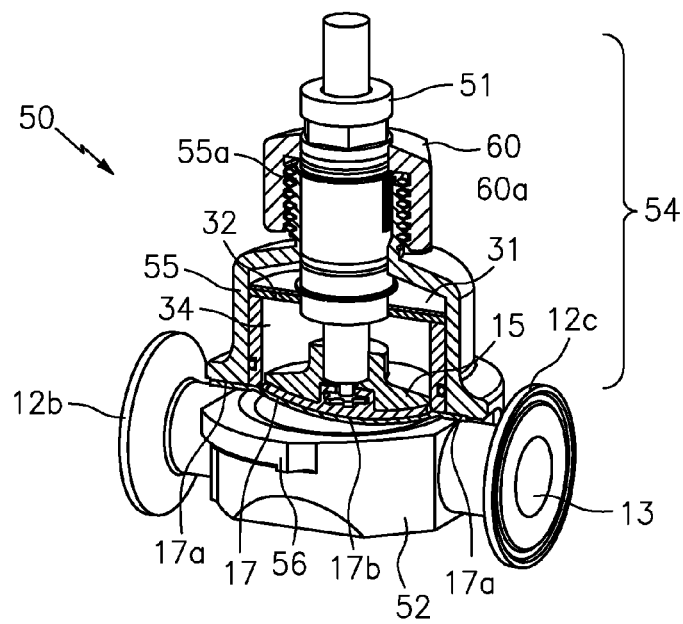
FIG. 4c shows a partial cross-sectional view of a bonnet assembly that forms part of a diaphragm valve according to some embodiments of the present invention.

FIGS. 3a to 3g show one version of the rotational connection or attachment, and FIGS. 4a to 4c show another version of the rotational connection or attachment, all according to some embodiments of the present invention. While the present invention is shown and described in relation to rotation connections or attachments, embodiments are envisioned in which a linear connection or attachment may be configured with the scope and spirit of the present invention.

FIGS. 3a to 3g

Consistent with that shown in FIGS. 3a, the valve body 12 includes at least two shouldered pins, studs or bolts 12a, two ports 12b, 12c, a weir (dam) portion 12d, and a rim or surface 12e.

Consistent with that shown in FIGS. 3b, the bonnet assembly 14 includes a cover 16, a knob 18, a bonnet portion 20 having a rim or surface 20a and at least two keyways 22.

In FIG. 3a, one part of the rotation connection include the rim or surface 12e being configured with the at least two shouldered pins 12a arranged on opposite sides of the valve body 12. In FIG. 3a, the rim or surface 12e is shown configured with four shouldered pins 12a arranged in a circular pattern, substantially equi-distant on the rim or surface 12e. In FIG. 3a, each shouldered pin 12a may be configured with one end $12a_1$ coupled to the rim or surface 12e and another end with a shouldered portion $12a_2$.

In FIG. 3b, the other part of the rotational connection includes the corresponding rim or surface 20a being configured with the at least two keyways 22 arranged on opposite sides of the bonnet assembly 14. As shown, each keyway 22 is recessed into the corresponding rim or surface 20a and is configured to receive and engage a respective shouldered pin 12a when the bonnet assembly 14 is rotated in relation to the valve body 12. In FIG. 3b, the rim or surface is shown configured with four keyways 22 arranged in a corresponding circular pattern as the four shoulder pins 12a on the rim or surface 20a. In FIG. 3b, each keyway 22 may include a first opening portion 22a configured to receive a respective shoulder portion $12a_2$ of the respective shouldered pin 12a. Each keyway may also include a second opening portion 22b configured to receive and engage the respective shoulder portion $12a_2$ when the respective shouldered pin 12a is inserted into a respective keyway 22 and the bonnet assembly 14 is rotated in relation to the valve body 12. As a person skilled in the art would appreciate, the shoulder portion $12a_2$ of the respective shouldered pin 12a is dimensioned to be smaller than the first opening portion 22a so as to pass through and into same, and is dimensioned to be larger than the second opening portion 22b so as to engaged and retained therein. As shown in FIG. 3f, the shoulder portion $12a_2$ is configured with a shoulder rim portion $12a_3$, and the second opening portion 22b is configured with a second opening rim portion 12c, When the respective shouldered pin 12a is inserted into the respective keyway 22 and the bonnet assembly 14 is rotated in relation to the valve body 12, the shoulder rim portion $12a_3$ engages the second opening rim portion 22c to retain the respective shouldered pin 12a in the respective keyway 22.

In FIGS. 3a to 3f, multiple shouldered pins 12a and keyways 22 are used to join the valve body 12 and bonnet assembly 14. When the multiple shouldered pins 12a are inserted into the keyways 22 and rotated, the valve body 12 and the bonnet assembly 14 cannot be pulled directly apart. In operation, these shouldered pins 12a and keyways 22 provide the reaction or retaining force, when the flanged joint is energized, consistent with that set froth below. In addition to the frictional resistance between the shouldered pins 12a and the keyways 22, embodiments are envisioned in which a detent in two or more of the keyways 22 may be used to insure that the bonnet assembly 14 and the valve body 12 cannot rotationally disengage once the load is applied, as the shouldered pins 12a will be loaded into the detents.

For example, energy, for the flanged joint to compress the diaphragm or gasket 17 and provide a tight peripheral seal, is provided by turning the cover 16. The cover 16 is attached to a central gear 28 (FIG. 3c), which rotates with it. The central gear 28 will turn multiple gear-headed screws 30. FIG. 3c shows three such gear-head screws 30. FIG. 3g shows the load travel path from the gear-headed screws 30, through at least one washer 31, compressing Belleville springs 32, to the pressure ring 34 (with a compressor hidden for clarity). The gear-headed screws 30 each have an end screw portion 30a configured to compress one or more spring disc washer(s) 31 and the Belleville springs 32 (see FIGS. 3e and 3g), which in turn drive the pressure ring 34 that provides the low spring constant pressure and compresses the peripheral portion 17a of the gasket or diaphragm 17 against the rim or surface 12e of the valve body or body flange 12 to seal the peripheral portion 17a of the diaphragm 17, as best shown in FIG. 3e. In effect, the screws 30 force the bonnet portion 20 apart from the combination of the one or more spring disc washer(s) 31, the Belleville springs 32 and the pressure ring 34, thereby providing a downward force on the pressure ring 34 to seal the diaphragm 17, and an upward force on the bonnet portion 20 to fix or retain the respective shouldered pin 12a in the respective keyway 22. The reader is also referred to patent application Ser. No. 13/554,541, filed 20 Jul. 2012 (911-002.051//F-EV-1202US), which is hereby incorporated by reference in its entirety, for alternative techniques for sealing the rim, surface or flange portion of the valve body with the peripheral portion of the diaphragm. The compressor 15 is configured to respond to the turning of the knob 18, and to close the valve passageway by causing a central part 17b of the diaphragm 17 to seal the weir portion 12d to prevent fluid from passing through the valve body 12, as best shown in FIG. 3d. However, the scope of the present invention is not limited to manual actuation of the compressor 15, since embodiments are envisioned using non-manual actuation of the compressor. For example other types or kinds of actuation may be used that provide thrust to the compressor 15, including, but not limited to manual, pneumatic, hydraulic, and electric motor actuation. The reader is also referred to patent application Ser. No. 13/554,535, filed 20 Jul. 2012 (911-002.049-1//F-EV-1201US), which is hereby incorporated by reference in its entirety, for alternative two-studded diaphragm techniques for sealing the weir portion of the diaphragm with the valve diaphragm. One advantage of the present invention is that this mechanism allows a reduction of the thread size used to create the peripheral load, which minimizes the frictional torque to achieve the required seal load.

Moreover, application of the load in this technique may be achieved without tools, however, tools may be employed to load the spring(s), and may even be required in certain loading methods, depending on valve size.

A key feature to the present invention is that this rotational connection or attachment method shown in FIGS. 2 and 3a to 3f allows the valve body 12 to bonnet assembly 14 to be essentially fixed with a very high spring constant, and independent from the compliant, lower spring constant, loading of the flanged seal. Due to these being independent features, another advantage of the present invention is that the compressor load applied by compressor 15, which closes the diaphragm 17, is resisted by the high spring constant shouldered pins or bolts without disturbing the lower spring constant flange seal which allows compliance for thermal expansion and creep reduction of the seal.

Another advantage of the present invention is the ability to make the valve body 12 to bonnet assembly 14 connection prior to energizing the flanged joint seal. This allows for simplicity and quick attachment/release of the connection.

As alternate attachment methods, the keyways 22 may be configured to fully enclose the studs as shown, or may only encase only the neck of the studs. Other simple "slide on " attachment methods may also be used prior to the load introduction.

As an alternate loading method, the force applied by the pressure ring 34 can be achieved by replacement of the gearheaded screws 30 (see FIGS. 3c to 3e) with standard screws or threads that can be turned down incrementally in a bolt pattern.

FIGS. 3a to 3g show other parts or elements that form part of the diaphragm valve 10, but do not form part of the underlying invention, including a compressor pin 40, O-rings, and are thus not discussed in detail.

FIGS. 4a to 4c

FIGS. 4a to 4c show the other version of the rotational connection or attachment for a diaphragm valve generally indicated as 50 having a valve body 52 and a bonnet assembly 54, according to some embodiments of the present invention. Parts in FIGS. 4a to 4b that are similar to parts in FIGS. 3a to 3g have similar part labels, e.g., including the ports 12b, 12c and the passage 13 of the valve body 52.

As shown, the rotation connection may include the valve body 52 being configured with a surface 52a and at least two radially-extending flange portions 56 arranged on opposite sides of the valve body 52. The bonnet assembly 54 has a bonnet portion 55 having a corresponding surface 54a configured with at least two channel portions 58. Each channel portion 58 is recessed and configured to receive and engage a respective radially-extending flange portion 56 when the bonnet assembly is rotated in relation to the valve body. Consistent with that set forth above, the rotational connection or attachment allows the valve body 52 and the bonnet assembly 54 to be substantially fixed together with a second spring constant that is substantially higher than and independent from a first spring constant.

The Central Loaded Thread Mechanism

The flange spring load may also be achieved by other means, such as a central thread. FIG. 4c shows an example of an alternative central load thread mechanism, including a cross sectional view showing centralized threads 55a.

As shown in FIG. 4c, the diaphragm valve 50 may be configured with a central loaded thread mechanism that forms part of the bonnet assembly 54, according to some embodiments of the present invention.

For example, the central load thread mechanism may include the bonnet portion 55 having threads 55a; a nut portion 60 having corresponding threads 60a and being configured to engage a spindle 51, so that when the nut portion 60 is rotated the pressure ring 34 loads or unloads the diaphragm 17 based at least partly on the first spring constant to close or open the passage 12c.

The Scope Of The Invention

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What I claim is:
1. Apparatus, including a diaphragm valve, comprising:
 a valve body configured with a passage to be opened to allow fluid to pass through the valve body and to be closed to prevent fluid from passing through the valve body;
 a bonnet assembly having a compressor, a pressure ring, and a diaphragm, the pressure ring configured to load and unload the diaphragm based at least partly on a first spring constant to seal a peripheral portion of the diaphragm, and the compressor configured to close or open the passage of the valve body; and
 the valve body and bonnet assembly being configured with a connection that allows the valve body and bonnet assembly to be substantially fixed together with a second spring constant that is substantially higher than and independent from the first spring constant, wherein the connection is a rotational connection that includes:

the valve body having a rim or surface configured with at least two shouldered pins arranged on opposite sides of the valve body; and the bonnet assembly having a corresponding rim or surface configured with at least two keyways arranged on opposite sides of the bonnet assembly, each keyway being recessed and configured to receive and engage a respective shouldered pin when the bonnet assembly is rotated in relation to the valve body.

2. Apparatus according to claim 1, wherein each shouldered pin is configured with one end coupled to the rim or surface and another end with a shouldered portion; and each keyway has a first opening portion configured to receive a respective shoulder portion of the respective shouldered pin, and each keyway has a second opening portion configured to receive and engage the respective shoulder portion when the respective shouldered pin is inserted into a respective keyway and the bonnet assembly is rotated in relation to the valve body.

3. Apparatus according to claim 1, wherein the valve body is configured with four shouldered pins arranged in a circular pattern, substantially equi-distant in relation to one another on the rim or surface; and the bonnet assembly is configured with four keyways arranged in a corresponding circular pattern as the four shoulder pins.

4. Apparatus, including a diaphragm valve, comprising:

a valve body configured with a passage to be opened to allow fluid to pass through the valve body and to be closed to prevent fluid from passing through the valve body;

a bonnet assembly having a compressor, a pressure ring, and a diaphragm, the pressure ring configured to load and unload the diaphragm based at least partly on a first spring constant to seal a peripheral portion of the diaphragm, and the compressor configured to close or open the passage of the valve body; and the valve body and bonnet assembly being configured with a connection that allows the valve body and bonnet assembly to be substantially fixed together with a second spring constant that is that is substantially higher than and independent from the first spring constant, wherein the bonnet assembly comprises a cover configured to be rotated to cause the pressure ring to seal the peripheral portion of the diaphragm based at least partly on the first spring constant.

5. Apparatus according to claim 4, wherein the cover is configured to attach to and rotate a central gear to cause the pressure ring to seal the peripheral portion of the diaphragm.

6. Apparatus according to claim 5, wherein the central gear is configured to turn multiple gear-headed screws that compress one or more spring disc washers and Belleville springs, which drive the pressure ring that compresses the diaphragm against the valve body to seal the peripheral portion of the diaphragm.

7. Apparatus, including a diaphragm valve, comprising:

a valve body configured with a passage to be opened to allow fluid to pass through the valve body and to be closed to prevent fluid from passing through the valve body;

a bonnet assembly having a compressor, a pressure ring, and a diaphragm, the pressure ring configured to load and unload the diaphragm based at least partly on a first spring constant to seal a peripheral portion of the diaphragm, and the compressor configured to close or open the passage of the valve body; and the valve body and bonnet assembly being configured with a connection that allows the valve body and bonnet assembly to be substantially fixed together with a second spring constant that is substantially higher than and independent from the first spring constant, wherein the bonnet assembly is configured with a central load thread mechanism that includes a cover portion having threads; and a nut portion having corresponding threads and being configured to engage metal elastic springs, so that when the nut portion is rotated, the pressure ring loads or unloads the diaphragm based at least partly on the first spring constant to seal the peripheral portion of the diaphragm, and the compressor configured to close or open the passage.

8. Apparatus, including a diaphragm valve, comprising:

a valve body configured with a passage to be opened to allow fluid to pass through the valve body and to be closed to prevent fluid from passing through the valve body;

a bonnet assembly having a compressor, a pressure ring, and a diaphragm, the pressure ring configured to load and unload the diaphragm based at least partly on a first spring constant to seal a peripheral portion of the diaphragm, and the compressor configured to close or open the passage of the valve body; and the valve body and bonnet assembly being configured with a connection that allows the valve body and bonnet assembly to be substantially fixed together with a second spring constant that is substantially higher than and independent from the first spring constant, wherein the connection includes:

the valve body being configured with a surface and at least two radially-extending flange portions arranged on opposite sides of the valve body; and the bonnet assembly having a corresponding surface configured with at least two channel portions, each channel portion being recessed and configured to receive and engage a respective radially-extending flange portion when the bonnet assembly is rotated in relation to the valve body.

* * * * *